United States Patent
Meggelaars et al.

(10) Patent No.: US 9,284,123 B2
(45) Date of Patent: Mar. 15, 2016

(54) TRANSPORT DEVICE WITH TWISTABLE CONVEYOR BELT AND METHOD OF USE

(75) Inventors: Sigebertus Johannes Jacobus Jozef Meggelaars, Eindhoven (NL); Leon Marie Francois Spierts, Maastricht (NL); Wilhelmus Josephus Gerardus Maria Jilesen, Vierlingsbeek (NL); Bart Henricus Jozef Verberk, Landhorst (NL); Dirk Meskendahl, Kranenburg (DE)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 0 days.

(21) Appl. No.: 13/976,834

(22) PCT Filed: Dec. 27, 2011

(86) PCT No.: PCT/NL2011/050904
§ 371 (c)(1),
(2), (4) Date: Aug. 29, 2013

(87) PCT Pub. No.: WO2012/091568
PCT Pub. Date: Jul. 5, 2012

(65) Prior Publication Data
US 2013/0327616 A1    Dec. 12, 2013

(30) Foreign Application Priority Data

Dec. 30, 2010   (NL) .................................... 2005940

(51) Int. Cl.
*B65G 15/60* (2006.01)
*B65G 21/10* (2006.01)

(52) U.S. Cl.
CPC ................ *B65G 15/60* (2013.01); *B65G 21/10* (2013.01)

(58) Field of Classification Search
CPC ........ B65G 15/60; B65G 15/64; B65G 21/10; B65G 21/12
USPC ..................... 198/806–808, 839, 861.1–861.5
See application file for complete search history.

(56) References Cited

U.S. PATENT DOCUMENTS

| | | | | |
|---|---|---|---|---|
| 3,540,571 A | * | 11/1970 | Marsh et al. ................... | 198/806 |
| 3,715,027 A | | 2/1973 | Fujimoto | |
| 3,920,115 A | * | 11/1975 | Craggs ........................... | 198/822 |
| 4,205,745 A | * | 6/1980 | VanLingen ..................... | 198/703 |
| 5,365,321 A | * | 11/1994 | Koshimizu et al. ............ | 399/329 |
| 5,467,171 A | * | 11/1995 | Castelli et al. ................. | 399/162 |
| 5,515,139 A | * | 5/1996 | Hou et al. ........................ | 399/38 |
| 6,786,235 B2 | * | 9/2004 | Liang .......................... | 137/625.4 |
| 7,434,680 B2 | * | 10/2008 | Kitamura ........................ | 198/806 |
| 7,438,180 B1 | * | 10/2008 | Taylor et al. ................. | 198/861.2 |
| 2004/0084286 A1 | * | 5/2004 | Damkjaer ....................... | 198/839 |
| 2005/0139456 A1 | | 6/2005 | Kitamura | |
| 2006/0076217 A1 | * | 4/2006 | Cumberlege .................. | 198/806 |
| 2007/0110471 A1 | * | 5/2007 | Kitamura ....................... | 399/101 |

FOREIGN PATENT DOCUMENTS

EP    0387242 A1    9/1990

* cited by examiner

*Primary Examiner* — Mark A Deuble
(74) *Attorney, Agent, or Firm* — Zarley Law Firm, P.L.C.

(57) ABSTRACT

The invention relates to a transport device (1) for carrying products with a displaceable carrying surface, comprising: a conveyor belt (3), a frame (2) provided with a belt guide (5-10) for holding the conveyor belt (3) displaceably, and a drive (4) for displacing the conveyor belt (3), wherein the belt guide (5-10) of the frame (2) is adjustable. The invention also relates to a method for allowing a conveyor belt (3) to connect to other devices.

13 Claims, 3 Drawing Sheets

TRANSPORT DEVICE WITH TWISTABLE CONVEYOR BELT AND METHOD OF USE

BACKGROUND OF THE INVENTION

The invention relates to a transport device for carrying products with a displaceable carrying surface, comprising: a conveyor belt, a frame provided with a belt guide for holding the conveyor belt displaceably, and a drive for displacing the conveyor belt. The invention also relates to a method for allowing a conveyor belt to connect to other devices.

Transport devices, and more particularly belt conveyors applied in the food processing industry, are usually provided with adjusting means with which they can be adjusted in height and set level. This type of adjusting means is usually incorporated in the legs/the frame of a transport device. It is otherwise noted here that these are often also processing devices of which the transport device forms part. It is for instance possible here to envisage shaping devices, sprinkling equipment, drying equipment, heating devices such as ovens, cutting devices and so on; the food products undergo a determined process herein but are meanwhile displaced through the processing station by a belt conveyor and finally transferred to a subsequent station. By adjusting the legs of a transport device (of which one or more processing stations optionally also form part) it can be placed horizontally on a ground surface which is usually deliberately not given a horizontal form so as to thus enable a good connection to other devices. It is thus possible in the food processing industry to apply floors which have an incline of up to 5%, this in order to enable good drainage. Using the adjustment adjacent transport devices can be placed at the same angle (usually level) in order to thus facilitate the transfer of products. The adjustment in/of the legs is further usually applied so as to ensure that the transport device is at the correct height, likewise to facilitate receiving (picking up) and/or delivery (transfer) of the products. This is particularly desirable if the products for transferring are fragile. The drawback of the existing adjusting means of transport devices is that they have to take a heavy and therefore expensive form because they must be able to support substantially the whole transport device (optionally including associated processing stations). An additional drawback is that such prior art adjusting means are usually difficult to operate, partly as a result of the heavy construction and the considerable loading thereof. The result hereof is that a less good arrangement of the transport device is also accepted in practice because difficult adjustment work is thereby avoided and because a precise adjustment is difficult, if not impossible.

SUMMARY OF THE INVENTION

The present invention has for its object to simplify the adjustment of transport devices with a conveyor belt such that they can be coupled in simplified manner to other devices, more particularly to thus enable transfer of fragile products without problematic deformation of or damage to this type of fragile product. Examples of such fragile products are, among others, breaded/battered products such as sausages, which are provided with coatings which are particularly susceptible to breaking, tearing and/or sinking into the belt.

This object is realized with a transport device of the type stated in the preamble, wherein the belt guide of the frame can be adjusted such that the conveyor belt is twistable. In combination with the ability to twist, it is desirable that the belt guide also be adjustable at an end position of the conveyor belt such that the angle enclosed with the horizontal by a line through the conveyor belt perpendicularly of the transport direction can be changed. It is a further advantage for the height also to be adjustable in that the belt guide is adjustable at an end position of the conveyor belt such that the distance to the ground of a line through the conveyor belt perpendicularly of the transport direction can be adjusted. The advantage of such a transport device with adjustable conveyor belt is that only the conveyor belt (and a part of the belt guide) need be adjusted. A large part of the mass, such as for instance frame, processing stations, drives, measuring and control means, need not be co-displaced. By means of the present invention the belt can be adjusted only at the position where this is actually necessary: at one or both end positions. Conversely, it is also possible to twist the belt locally at a position where a determined operation must be performed on/with the products located on the conveyor belt. Particularly at a location where the infeed of products and/or the outfeed of products takes place there will in practice be a need for a precise positioning; this can be realized by locally rotating (=twisting) the belt in order to thus obtain the desired belt orientation.

If the belt guide can also be adjusted at an end position of the conveyor belt such that the distance to the ground of a line through the conveyor belt perpendicularly of the transport direction can be changed, not only can the orientation of the end part of the conveyor belt be adjusted as required, its height can moreover also be adjusted such that it is in full accordance with wishes. This has the result that the present invention enables connection of the conveyor belt to any desired adjacent infeed and/or outfeed device, this of course within determined limits defined by the chosen dimensions of the transport device.

Twisting of the belt can be realized in relatively simple structural manner using a belt guide comprising at an end position of the conveyor belt a reversing element, the longitudinal shaft of which is displaceable relative to the horizontal. The transport device can of course also be provided at both outer ends with such a displaceable reversing element. Rotating the belt guide causes the belt to thereby also be co-rotated locally. In a specific embodiment variant this reversing element with a longitudinal shaft displaceable relative to the horizontal is provided with a stationary guide element (sometimes also referred to as a "nose"), although the reversing element can alternatively also comprise at least one reversing roller. This will be further elucidated with reference to the figures. In yet another embodiment variant at least a part of the frame can be deformed such that this deformation results in rotation of the reversing element, resulting in twisting of the conveyor belt. For the purpose of displacement of the belt guide it is also possible that it be embodied such that at least a part thereof is displaceable relative to the frame.

In order to fix an adjusted position it is desirable for the transport device to be provided with at least one locking for locking the belt guide in a desired position. An adjusted position can thus also be retained.

In order to cause the conveyor belt of the transport device to be twistable it must be embodied such that it is deformable. This can for instance be realized with an endless twistable grill belt which can be manufactured from metal or plastic (also referred to as a plastic linkage belt). Another option for a twistable conveyor belt is an endless, closed conveyor belt manufactured from flexible material.

The present invention also provides a method for allowing a conveyor belt to connect to other devices, comprising the processing steps of: A) adjusting the height of an end position of the conveyor belt relative to the ground, and B) adjusting the orientation of an end position of the conveyor belt relative to the ground such that the angle enclosed with the ground by a line at the end position of the conveyor belt perpendicularly of the transport direction changes, wherein the conveyor belt twists. Using this method the advantages can be realized as already described above in respect of the transport device according to the present invention. As already elucidated on the basis of the transport device, it is possible here for the conveyor belt to be twisted as according to processing step B) by changing the orientation of a reversing element of the conveyor belt. It is however also possible for the conveyor belt to be twisted as according to processing step B) by locally displacing a belt guide.

BRIEF DESCRIPTION OF THE DRAWING

The present invention will be further elucidated on the basis of the non-limitative exemplary embodiments shown in the following figures. Herein.

DETAILED DESCRIPTION OF THE PREFERRED EMBODIMENTS

Figure 1:
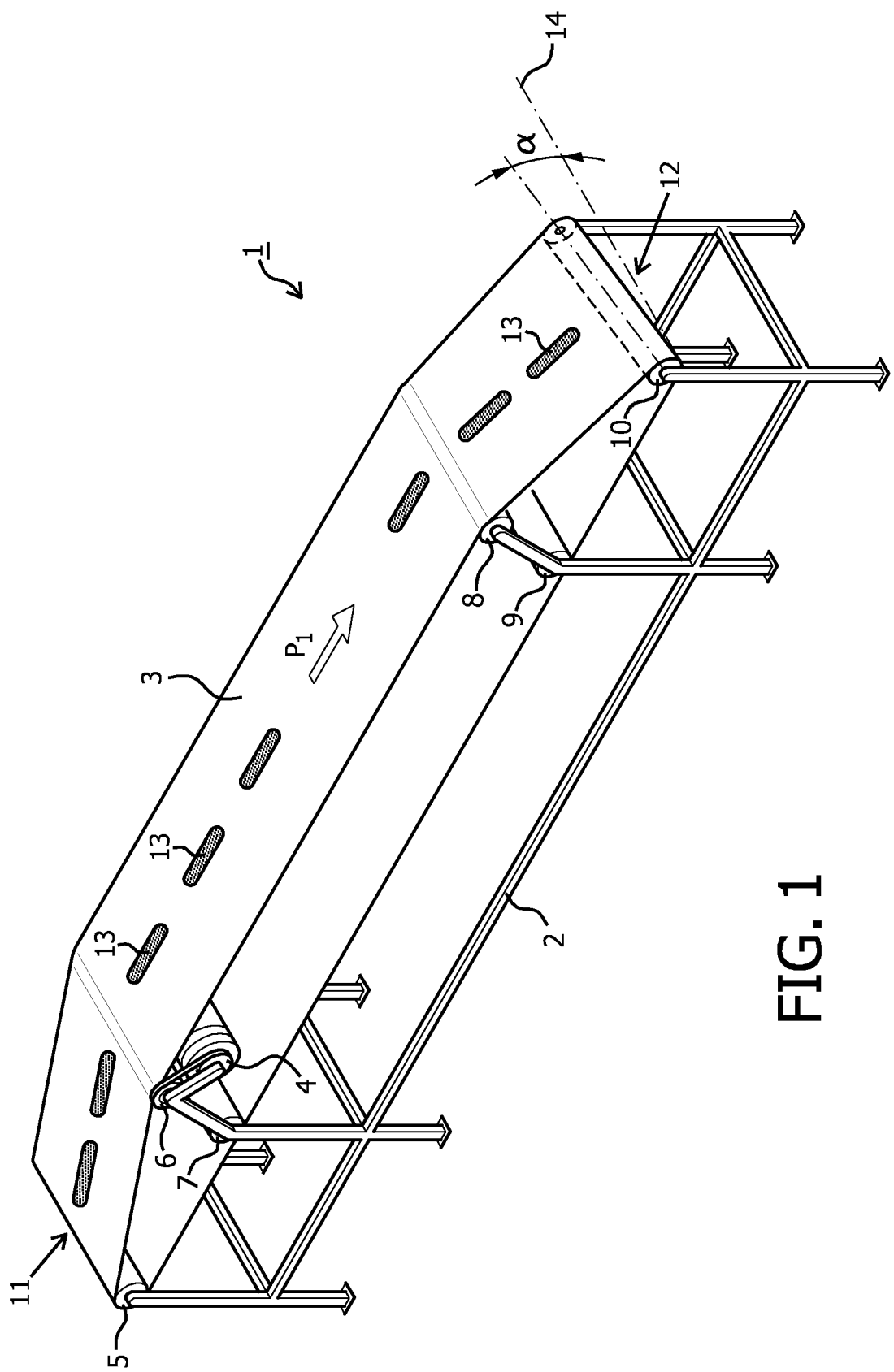
FIG. 1 is a schematic perspective view of a transport device according to the present invention.

FIG. 1 shows a transport device 1 provided with a frame 2 supporting an endless conveyor belt 3. Conveyor belt 3 is displaceable in a direction as indicated by arrow $P_1$ by means of a drive 4. Conveyor belt 3 is held in position by a belt guide consisting of rotatable rollers 5-10, wherein reversing rollers 5 and 10 define the end positions 11 and 12 of conveyor belt 3. At end position 11 products such as the sausages 13 shown here can be placed on the upper part of conveyor belt 3 and at end position 12 the sausages 13 can then be set down onto a subsequent product carrier (not shown here). Reversing roller 10, which defines end position 12 of conveyor belt 3, can be adjusted such that an angle ∀ which reversing roller 10 encloses with a horizontal line 14 is adjustable, resulting in a part of conveyor belt 3 twisting. The advantage of twisting conveyor belt 3 at end position 12 is that the orientation of conveyor belt 3 can thus be locally modified. The connection of conveyor belt 3 to a subsequent product carrier can thus be optimized in simple manner without the whole transport device 1 requiring adjustment for this purpose.

Figure 2:
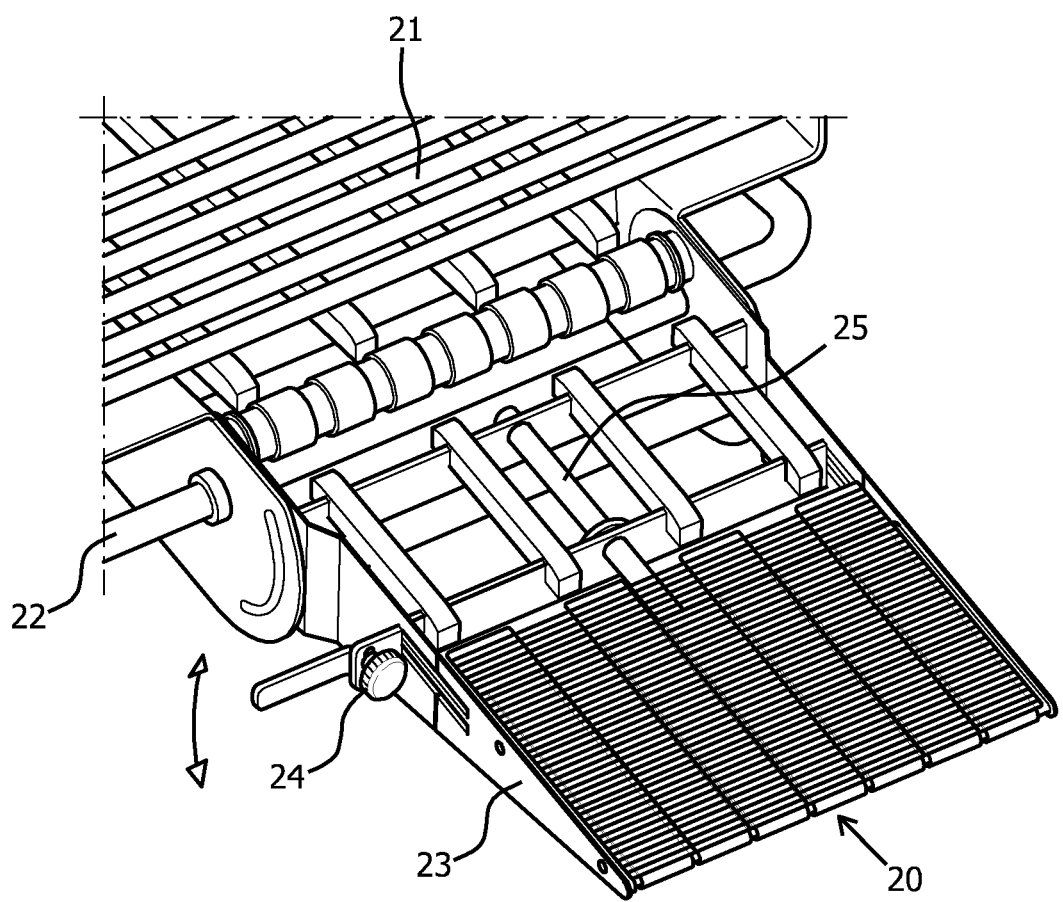
FIG. 2 is a perspective view of a part of an alternative embodiment variant of a transport device according to the present invention.

FIG. 2 shows a detail of a transport device which is a variant of the transport device 1 shown in FIG. 1. Shown is an outfeed part 20 of a conveyor belt 21 which is rotatable round a shaft 22 for the height adjustment of the shown end position of conveyor belt 21. Frame part 23 which bears outfeed part 20 takes a limp form such that it is twistable. Twisting of frame part 23, and as a result changing the orientation of outfeed part 20, is possible by rotating a knob 24, thereby rotating an adjustment shaft 25 which is coupled to outfeed part 20.

Figure 3:
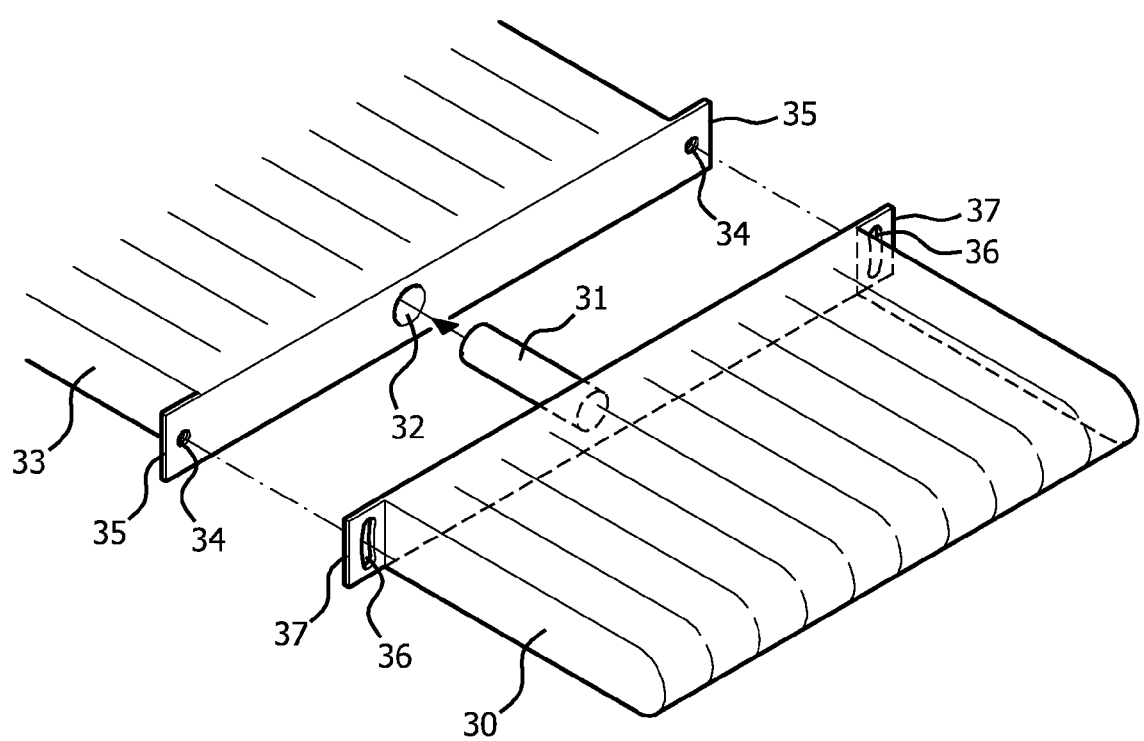
FIG. 3 is a perspective view of a schematically shown part of a second alternative embodiment variant of the transport device according to the present invention.

FIG. 3 shows highly schematically a detail of yet another transport device according to the present invention. Shown is an outfeed part 30 of a conveyor belt (not further shown) which is carried round outfeed part 30. This outfeed part 30 is rotatable around a shaft 31 and (after mounting of the shaft in opening 32) connects to another part of a belt guide 33. For a reliable coupling of outfeed part 30 to horizontal belt guide 33, pins can be inserted through openings 34 and into protruding parts 35 arranged for this purpose on horizontal belt guide 33, which pins also engage on slots 36 arranged in protruding parts 37 forming part of outfeed part 30.

What is claimed is:

1. Food processing transport device for carrying food products with a displaceable carrying surface, comprising:
   a conveyor belt,
   a frame provided with a belt guide for holding the conveyor belt displaceably, and
   a drive for displacing the conveyor belt,
   wherein at least a portion of the frame deforms such that the conveyor belt is twistable,
   wherein the belt guide is adjustable at an end position of the conveyor belt such that an angle enclosed with the horizontal by a line through the conveyor belt perpendicularly of the transport direction can be adjusted, and
   the belt guide is adjustable at an end position of the conveyor belt such that the distance to the ground of a line through a center of the conveyor belt perpendicularly of the transport direction can be changed.

2. Transport device as claimed in claim 1, characterized in that the belt guide comprises at an end position of the conveyor belt a reversing element, the longitudinal shaft of which is displaceable relative to the horizontal.

3. Transport device as claimed in claim 1, characterized in that the belt guide comprises at an end position of the conveyor belt a reversing element with a longitudinal shaft displaceable relative to the horizontal.

4. Transport device as claimed in claim 1, characterized in that the belt guide comprises at an end position of the conveyor belt a reversing element with a longitudinal shaft displaceable relative to the horizontal, the reversing element comprising at least one reversing roller.

5. Transport device as claimed in claim 1, characterized in that at least a part of the frame can be deformed such that the deformation of the frame results in twisting of the conveyor belt.

6. Transport device as claimed in claim 1, characterized in that at least a part of the belt guide is displaceable relative to the frame.

7. Transport device as claimed in claim 1, characterized in that the transport device is provided with at least one locking for locking the belt guide in a desired position.

8. Transport device as claimed in claim 1, characterized in that the transport device comprises an endless twistable belt.

9. Transport device as claimed in claim 1, characterized in that the transport device comprises an endless, twistable closed conveyor belt.

10. Method for allowing a food processing conveyor belt to connect to other devices, comprising the processing steps of:
   A) adjusting the height of an end position of a center of the conveyor belt relative to the ground, and
   B) adjusting the orientation of an end position of the conveyor belt relative to the ground by deforming at least a part of a frame such that the angle enclosed with the ground by a line at the end position of the conveyor belt perpendicularly of the transport direction changes, wherein the conveyor belt twists.

11. Method as claimed in claim 10, characterized in that the conveyor belt is twisted as according to processing step B) by changing the orientation of a reversing element of the conveyor belt.

12. Method as claimed in claim 10, characterized in that the conveyor belt is twisted as according to processing step B) by locally displacing a belt guide.

13. Method as claimed in claim 10, characterized in that an adjusted position of the conveyor belt is locked.

* * * * *